Feb. 11, 1941. K. R. D. WOLFE 2,231,696
GAS PRESSURE BOOSTER SYSTEM
Filed Dec. 28, 1938 2 Sheets-Sheet 1
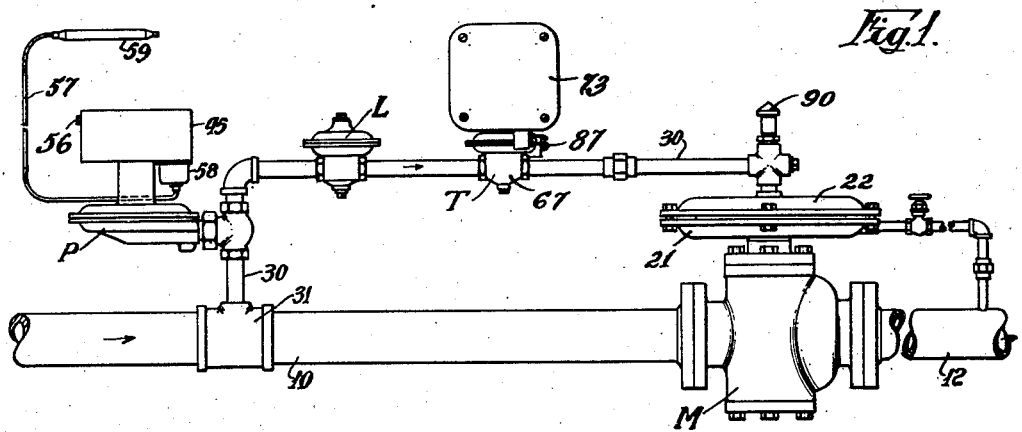
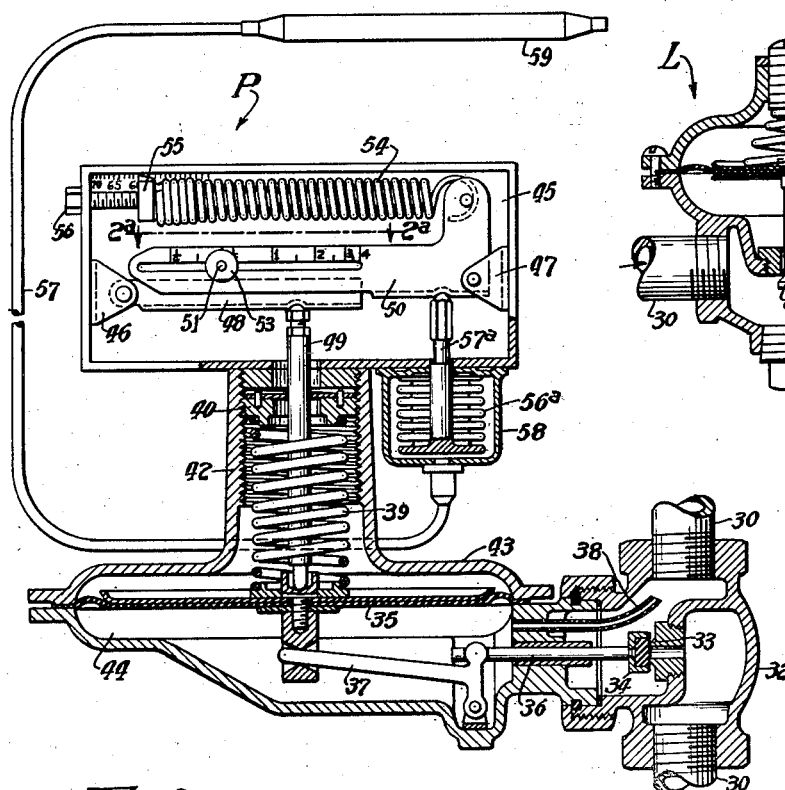
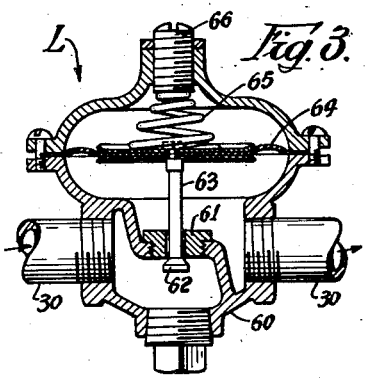
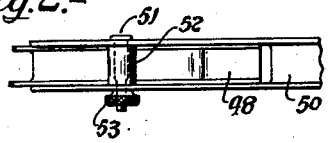
Inventor:
Kenneth R. D. Wolfe,
By Bair & Freeman
Attorneys Feb. 11, 1941. K. R. D. WOLFE 2,231,696
GAS PRESSURE BOOSTER SYSTEM
Filed Dec. 28, 1938 2 Sheets-Sheet 2

Inventor:
Kenneth R. D. Wolfe,
By: Bair & Freeman
Attorneys.

Patented Feb. 11, 1941

2,231,696

UNITED STATES PATENT OFFICE 2,231,696

GAS PRESSURE BOOSTER SYSTEM

Kenneth R. D. Wolfe, Marshalltown, Iowa, assignor to Fisher Governor Company, Marshalltown, Iowa, a corporation of Iowa Application December 28, 1938, Serial No. 248,142

17 Claims. (Cl. 50—18)

An object of my invention is to provide a gas pressure booster system which is comparatively simple in construction and operation and which effects a desirable boosting of gas pressures to compensate for peak load demands on a gas distributing system.

A further object is to provide means to boost the gas pressure at a district regulator so that the pressure going into the distributing main may be boosted to compensate for peak loads on the distributing main.

Another object is to provide a gas pressure booster system in which the boosted pressure is in accordance with ambient temperature changes rather than responsive to the load itself, thus providing a very simple and inexpensive system for this purpose.

In this connection, I have found that particularly in the natural gas distribution systems in the southern territories of the United States it is common practice to distribute gas through a series of pipe lines, starting out with what is known as the "high pressure" system carrying in the neighborhood of fifty pounds at the town border station. From there an intermediate supply main carries anywhere from two to ten pounds' pressure and usually makes a continuous loop around the town. At various points in the intermediate supply main district regulators are installed which reduce the five to ten pound pressure down to the neighborhood of six ounces, or eight or nine inches water column pressure. By means of the district regulators an attempt is made to maintain this pressure in the low pressure supply means, and these mains are interlocked in more or less a continuous web with all of the district regulators feeding into the low pressure distributor main system. The pressure of six ounces is the pressure delivered to the consumer for his gas-burning appliances.

One problem involved with a system of this nature, is that during peak loads caused by residential heating during the winter months it is necessary to increase the pressure delivered by the district regulators in proportion to the load because, as the demand for gas increases in the supply main system, the pressure drop through the system increases due to increased pipe line friction as the load increases and there is experienced low pressure points where unless the pressure is boosted at the district regulators the pressure at the low point in the system may fall below the proper burning pressure and may cause consumer complaints.

It has been common practice to manually adjust the individual district regulators in accordance with temperature changes, and in some cities this is a major problem calling for the necessity of keeping a number of men and trucks working at times twenty-four hours a day adjusting various regulators to compensate for temperature changes. These changes can be more or less anticipated, particularly from weather reports, but there are many cases where an expected temperature change has not materialized and the settings of the regulators have been changed in anticipation of such an expected temperature change and therefore must be readjusted or they will operate in accordance with the expected temperature change instead of in accordance with actual temperature conditions. It is always desirable to keep the pressure in the supply distributing main just as low as possible according to the necessary demand, because an excessive pressure in the main naturally increases the gas leakage and results in a so-called "gas unaccounted for" condition.

I have found by investigation and research that the gas peak load demands in the distributing main system increase almost directly in proportion to the atmospheric temperature drop, starting with a temperature of about 65° Fahrenheit. By way of example, in one instance I found that at a temperature of 65° the gas load demand was 200,000 cubic feet per hour; at 55° the demand was 280,000 cubic feet per hour; at 45° the demand was 370,000 cubic feet per hour, and at 10° the demand was 700,000 cubic feet per hour. This is a direct relationship between temperature and gas consumption, with the load automatically increasing in a proportional value. I found that these values held true over a period of many months.

Accordingly, it is one of the most important objects of my invention to provide a gas pressure booster system in which the district regulators supply gas at a pressure that increases in direct proportion to the ambient temperature decrease. More particularly, an object of my invention is to provide a main pressure reducing valve and a pilot reducing valve for controlling the action of the main reducing valve with a temperature responsive means modifying the action of the pilot reducing valve and thereby changing the regulating pressure of the main reducing valve in response to temperatures affecting the temperature responsive mechanism.

A further object is to provide a reducing valve which limits the maximum boosting limit of the pilot reducing valve as it responds to an exceptionally low temperature.

Still another object is to provide a time controlled valve for rendering ineffective the temperature control mechanism during a predetermined period of a twenty-four hour day as when the peak load demand is removed. In this connection, I have found that in most of the southern states of the United States floor furnaces and radiant heaters are used in proportion to ambient temperature decrease below about 65° Fahrenheit except between the hours of about 10:30 p. m. and 6:00 a. m., so that between these hours the temperature responsive mechanism can be dispensed with and the main reducing valve setting returned to minimum. This also aids in keeping the distributing main pressure as low as possible to avoid gas leakage.

Other objects, purposes and characteristic features of my invention will be partially obvious from the accompanying drawings and partially pointed out as the description of the invention proceeds. In describing the invention in detail, reference will be made to the accompanying drawings, in which like reference characters designate corresponding parts throughout the several views and in which Figure 1 is a side elevation of a gas pressure reducing system embodying my invention;

Figure 2 is an enlarged sectional view through a temperature modified pilot reducing valve of my system;

Figure 2a is an enlarged sectional view on the line 2a—2a of Figure 2;

Figure 3 is an enlarged sectional view through a maximum boost limit regulator of my system;

Figure 4:
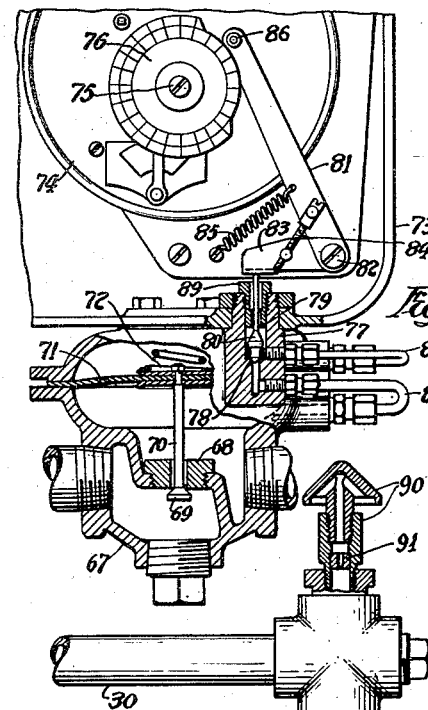
Figure 4 is a partial sectional view through a time-operated valve structure of the system.

On the accompanying drawings I have used the reference numeral 10 to indicate a gas supply pipe and the numeral 12 a gas distributing pipe. Between the pipes 10 and 12 is a main reducing valve M.

The reducing valve M comprises a valve body 13 having valve discs 14 and 15. Valve disc holders 16 and 17 are adapted to cooperate therewith in an obvious manner to secure balanced operation of the valve. The disc holders 16 and 17 are connected together by a post 18 and the post 18 is connected by a stem 19 to control diaphragm 20.

The diaphragm 20 is mounted in a diaphragm casing comprising a lower part 21 and an upper part 22. The parts 21 and 22 are secured together as by bolts 23. The part 21 is rigidly supported relative to the valve body 13.

In the part 21 I provide a sleeve 24 for the stem 19. A lubricant gland 25 is provided in the sleeve and is filled with lubricant 26 for the stem. The lubricant is adapted to be introduced through a fitting 27.

The under side of the diaphragm 20 is connected by piping 28 with the distributing main 12. The connection is preferably some six to ten feet on the downstream side of the main reducing valve M and accordingly the piping 12 and 28 has been broken away on the drawings. A valve 29 is interposed in the piping 28 and is normally open during operation, it being merely provided to shut off the supply of gas from the piping 28 to the diaphragm chamber 21 when desired for installation or repair of parts.

The upper diaphragm chamber 22 is connected by piping 30 with a T-fitting 31 arranged in the supply main 10. Interposed in the piping 30 is a pilot reducing valve P, a maximum boost limit regulator L and a time-controlled valve T.

The pilot reducing valve P comprises a valve body 32 having a valve seat 33 and a valve disc 34 for seating thereagainst. The disc 34 is controlled as to position by a diaphragm 35 through the medium of a slidable stem 36 and a pivoted lever 37.

One side of the diaphragm 35 is responsive to the outlet pressure in the valve body 32 through a tube 38. The other side is responsive to the pressure of an adjusting spring 39. The compression of the spring 39 may be varied by rotation of an adjusting spring follower 40 which is threaded relative to a boss 42 extending upwardly from a diaphragm chamber of the valve 32. The diaphragm chamber consists of an upper part 43 and a lower part 44.

Mounted on the boss 42 is a housing 45 in which is mounted a pair of brackets 46 and 47. A lever 48 is pivoted to the bracket 46 and is adapted to contact with one end of a stem 49, the other end of which is operatively associated with the diaphragm 35.

A bell crank lever 50 is pivoted to the bracket 47 and an adjusting screw 51 is carried thereby. A roller or spacer 52 is mounted on the screw 51, as shown in Figure 2a, and may be retained in various adjusted positions by a nut 53. The spacer 52 is adapted to engage the upper edge of the lever 48 and thereby modify the action of the valve 34 which is primarily controlled by the reduced or low pressure side of the valve.

A spring 54 is connected with the bell crank lever 50 and has a plug 55 threadedly receiving an adjusting screw 56. Opposing the spring 54 is a temperature responsive bellows 56a having a stem 57a contacting with the lever 50. A capillary tube 57 extends from a bellows housing 58 which encloses the bellows 56a and terminates in a bulb 59. The bulb, tube and housing are charged with a suitable fluid, such as methyl chloride, whereby an increase in temperature affecting the bulb will cause an expansion or vaporization of the fluid therein and a consequent tendency to collapse the bellows 56, thus exerting an upward force on the stem 57a in proportion with the temperature increase.

The maximum boost limit regulator L, as shown in Figure 3, comprises a valve body 60 having a valve seat 61. A valve plug 62 is adapted to seat thereagainst and is connected by a stem 63 with a diaphragm 64. The under side of the diaphragm is responsive to the low or reduced pressure through the valve so as to fix the upper limit of pressure flowing through the valve L, which limit may be adjusted by varying the compression of a spring 65. A set screw 66 is provided for this purpose.

The time control valve T, as shown in Figure 4, comprises a valve body 67 having a valve seat 68. A valve plug 69 is adapted to seat thereagainst and is connected by a stem 70 with a diaphragm 71. A spring 72 tends to unseat the valve 69.

A housing 73 is mounted on the valve T and within the housing clockwork as indicated generally by the reference character 74 is provided. The clockwork 74 has a shaft 75 which rotates once for a given period of time such as each twenty-four hour period, and on this shaft a cam 76 is mounted. The cam 76 is preferably made of sheet metal and marked in hours, so that when the installation is made the cam may be cut for operation at the desired hours by means of tin snips.

Figure 4A:
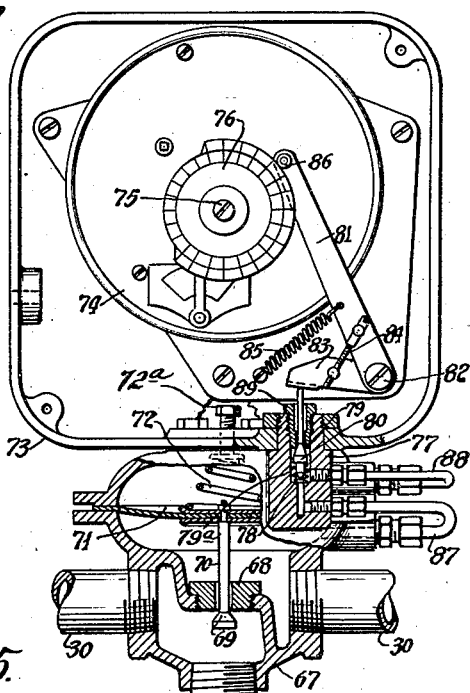
Figure 4a is a view of parts of Figure 4 in a different position.
Figure 5:
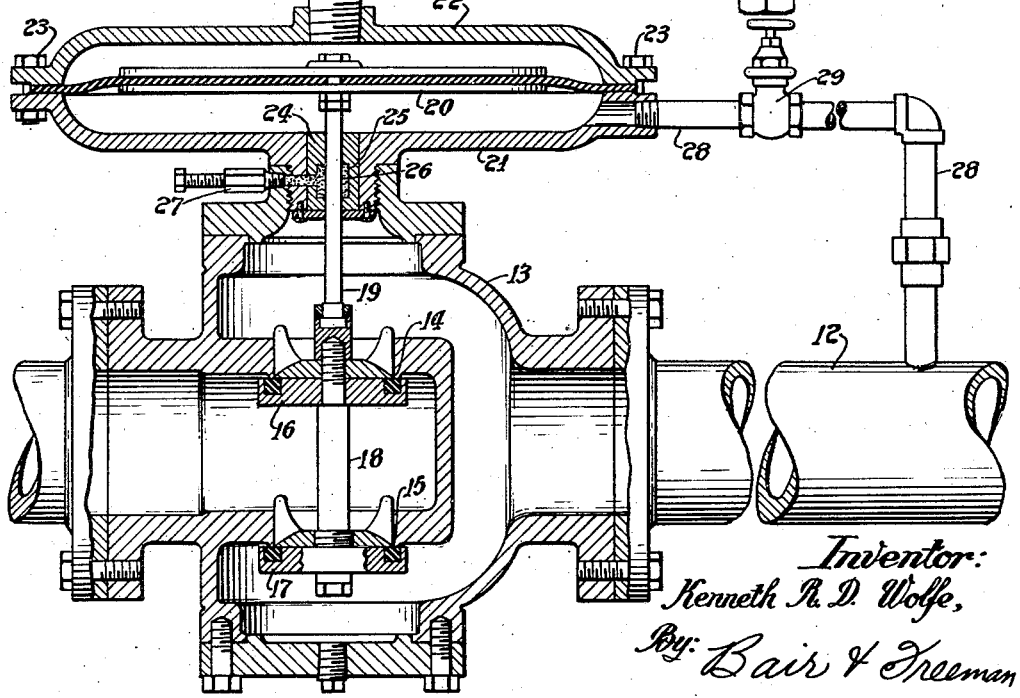
Figure 5 is an enlarged sectional view through the main reducing valve of my gas pressure booster system.

A valve block 77 is mounted on the housing 73 and includes a pair of valve seats 78 and 79. A valve plug 80 is adapted to seat on one or the other of the seats, depending on the position of a control arm 81. The control arm 81 is pivoted at 82 and is connected with a lever 83 by an adjustable connection 84. A spring 85 tends to engage the valve plug 80 with the valve seat 78 when a roller 86 on the lever 81 is on the low part of the cam 76 as shown in Figure 4a. When the roller 86 is on the lobe of the cam, the lever 83 is moved to such a position that the gas pressure through a tube 87 retains the valve seated against the seat 79, with the assistance of a spring 79a.

The tube 87 is connected with the low side of the valve 67 while the space in the valve block 77 between the seats 78 and 79 is connected by a tube 88 with the top of the diaphragm 71. The seat 79 communicates with atmosphere through a sleeve 89.

In the pipe line 30 between the valves T and M, I provide a vent fitting 90 including an orifice plug 91 having a capillary bore to permit slight leakage to atmosphere so there will be a constant flow through the valves P, L and T to effect accurate regulation of the pressure on top of the diaphragm 20 in the valve M.

*Practical operation*

In the operation of my gas pressure booster system, after the system is installed and placed in operation the bell crank lever 50 of the temperature controlled pilot reducing valve P will be held in such position that the spacer 52 will not contact with the lever 48 as long as the temperature is above that for which the spring 54 has been adjusted. By way of illustration, Figure 2 shows the adjustment set at 60°.

Pressure through the tube 38 from the low side of the reducing valve 32 will act on the bottom of the diaphragm 35 to maintain a predetermined pressure in the low side of the pipe line 30 to act on the top of the diaphragm 20 of the main valve M. This pressure may be adjusted by varying the compression of the spring 39 by rotation of the adjusting nut 40. The pressure for which the valve 32 is set is equal to the pressure desired in the supply main 12 minus the weight of the diaphragm 20 and the parts 19, 16, 18 and 17 connected therewith. The pilot reducer valve P therefore normally maintains the desired pressure within the diaphragm chamber 22 by a small constant flow of gas through the valve 32 as the gas leaks through the orifice of the plug 91 of the vent 90.

Whenever the ambient temperature affecting the bulb 59 recedes below 60° (the bulb 59 being preferably located in a position exposed to atmospheric temperature but protected from the sun rays), the spring 54 will be imposed to greater or less degree, depending on how much the temperature has lowered below 60°, on the arm 48. This will modify the action of the diaphragm 35 so that the lower the ambient temperature the greater will be the pressure on the low pressure side of the valve 32 and consequently in the diaphragm chamber 22. This will effect an increase in the reduced pressure in the supply main 12.

Different installations require different degrees of increase of the pressure in the diaphragm chamber 22 in accordance with a unit of temperature drop. This may be predetermined by a preliminary survey in which gas consumption and temperature are compared. By way of illustration, the adjusting screw 51 has been set for ½-inch water column pressure increase per ten degrees of temperature drop, the arm 50 being graduated in this manner. These graduations and this showing of the temperature setting of the spring plug 55 are arbitrary, and may be varied as desired. Obviously, a large locality would experience greater pressure drop in accordance with temperature drop, and the adjustment 51 is provided to take care of the different requirements of the different installations of district regulators.

The valve L may be used when it is desirable to limit the maximum pressure boost of the system. For instance, the pressure boost may be so great at ten degrees above zero that it is undesirable to have any further pressure boost even though the temperature reduces further. Accordingly, the valve L can be set so that at ten degrees above zero it regulates the pressure to a predetermined value, and any attempt of the valve P to increase this value is defeated by the valve L limiting the value. Whenever the temperature goes above ten degrees above zero, however, then the valve L opens wide enough to let the valve P be the controlling factor in regulating the pressure to the chamber 22 of the main valve M.

The time controlled valve T is used only when it is desirable to eliminate the effect of the temperature controlled mechanism during a part of the day. Even though the temperature is below that for which the spring 54 is set, there will be no boosting of pressure because the valve T acts as a limiting reducing valve. This is accomplished by keeping the valve plug 69 open during the portion of the day that the temperature controlled mechanism is to operate, as shown in Figure 4. The valve plug 80 being seated against the seat 79 permits equalization of the pressure on the lower and upper sides of the diaphragm 71, so that the spring 72 keeps the valve 69 open. When it is desirable to have the temperature controlled means ineffective, then the parts assume the position shown in Figure 4a for closing the valve 80 on the seat 78, thus permitting the pressure on the top of the diaphragm 71 to escape to atmosphere through the port 89. Thereupon the spring 72 will balance the outgoing pressure of the valve 67 to maintain a pressure which is substantially equal to the pressure for which the spring 39 of the pilot valve P is set. For this purpose an adjusting screw 72a is provided for the spring 72, so that when the parts are in the position shown in Figure 4a the valve T acts as a reducing valve to maintain the desired pressure in the diaphragm chamber 22 even though the valve P is calling for a higher pressure.

My system permits the use of a temperature modified pilot valve to control a main reducing valve in an inexpensive manner as compared to the types of regulators which are responsive to gas flow through them. Since I have found that there is a definite relationship between gas consumption and temperature drop below a predetermined point, it is possible to use such a hook-up as disclosed and set the temperature responsive device in the manner described to secure the desired results, in view of the findings with respect to temperature and gas consumption relationship. The valve L acts as a means to limit the amount of boosting and the valve T stops the boosting action during a period of time when it is unnecessary and therefore undesirable.

Having described one specific embodiment of my system, together with the operation thereof, I desire it to be understood that this form is selected merely for the purpose of facilitating disclosure of the invention rather than for the purpose of limiting the number of forms which it may assume. It is to be further understood that various modifications, adaptations and alterations may be applied to the specific form disclosed to meet the requirements of practice without in any manner departing from the spirit and scope of the present invention except as set forth in the claims appended hereto.

I claim as my invention and desire to secure by Letters Patent of the United States:

1. In a gas pressure booster system, a main reducing valve connected between a supply main and a distributing main and including a control diaphragm responsive to pressure in the distributing main to move said valve toward closed position as the distributing main pressure increases, means operable on said diaphragm to oppose the distributing main pressure, said last means being substantially constant whereby to regulate the degree of the reduced pressure from said main reducing valve and means responsive to ambient outdoor atmospheric temperature for increasing the effect of said means operable on said diaphragm to oppose the distributing main pressure, said means responsive to ambient temperature comprising a valve which is opened to permit gas flow to said control diaphragm only when the ambient temperature falls below a predetermined degree, said valve in the range of temperature below said predetermined degree, being opened in proportion to the temperature drop whereby the effect of said means operable on said diaphragm to oppose the distributing main pressure is modified in similar proportions.

2. In a pressure booster system, a reducing valve connected between a supply main and a distributing main and including a control element responsive on one side to pressure in the distributing main, means operable on the other side of said element to oppose the distributing main pressure, said last means being substantially constant whereby to regulate the degree of the reduced pressure from said reducing valve and means responsive to ambient outdoor atmospheric temperature, and including a valve for controlling gas flow to said other side of said control element of said reducing valve for modifying the effect of said distributing main pressure operable on said one side of said control element.

3. In a gas pressure booster system, an adjustable main reducing valve connected between a supply main and a distributing main, means responsive to ambient temperature and operatively connected with the operating mechanism of said reducing valve to change the adjustment thereof and thereby increase the reduced pressure in proportion to decrease in ambient temperature below a predetermined maximum value in conjunction with the operation of said main reducing valve in response to the distributing main pressure, means to limit the maximum increase of the degree of reduced pressure and time-controlled means to render ineffective the ambient temperature responsive means during a predetermined time period.

4. In a gas pressure booster system, an adjustable main reducing valve, means responsive to ambient temperature to change the adjustment of the operating mechanism thereof and thereby increase the reduced pressure in proportion to decrease in ambient temperature in conjunction with the operation of said main reducing valve in response to the outgoing pressure thereof, means to limit the maximum increase of the degree of reduced pressure and time-controlled means to render ineffective the ambient temperature responsive means during a predetermined and regularly repeated time period.

5. In a gas pressure booster system, an adjustable main reducing valve, means responsive to ambient temperature to change the adjustment of the pressure responsive mechanism of said reducing valve and thereby increase the reduced pressure in proportion to decrease in ambient temperature with said reducing valve functioning as a result of both said ambient temperature responsive means and the outgoing pressure of said reducing valve, and time-controlled means to render ineffective the ambient temperature responsive means during a predetermined period of a twenty-four hour day.

6. In a system of the character disclosed, an adjustable main reducing valve connected between a supply main and a distributing main, said valve including a pressure responsive element responsive on one side to reduced pressure in the distributing main and on the other side to the pressure in the supply main, a pilot reducing valve between said supply main and said other side of the pressure responsive element of said main reducing valve to normally set the main reducing valve for operation at a predetermined pressure, and ambient temperature responsive means modifying the action of said pilot reducing valve upon ambient temperature falling below a predetermined value.

7. In a gas pressure booster system, an adjustable main reducing valve, said valve including a pressure responsive element responsive on one side to reduced pressure from the main reducing valve and on the other side to the incoming pressure, a pilot reducing valve between the incoming pressure line and said other side of said pressure responsive element to normally set the main reducing valve for operation at a predetermined pressure and ambient temperature responsive means modifying the action of said pilot reducing valve to increase the pressure therefrom in proportion to a fall of the ambient temperature.

8. In a gas pressure booster system, an adjustable main reducing valve connected between a supply main and a distributing main, said valve including a pressure responsive element responsive on one side to reduced pressure in the distributing main and on the other side to pressure in the supply main, a pilot reducing valve between said supply main and said pressure responsive element to normally set the main reducing valve for operation at a predetermined pressure, ambient temperature responsive means modifying the action of said pilot reducing valve upon ambient temperature falling below a predetermined value, said ambient temperature responsive means being adjustable to vary the temperature at which it becomes operative to cause such modification, and variable lever means to change the degree of such modification per unit of ambient temperature decrease.

9. In a pressure booster system, an adjustable reducing valve including a pressure responsive element responsive on one side to the reduced pressure and on the other side to incoming pressure, a pilot reducing valve for diminishing the pressure to said other side of said pressure responsive element of said first reducing valve to normally set it for operation at a predetermined pressure, ambient temperature responsive means modifying the action of said pilot reducing valve upon ambient temperature change, and variable means to change the degree of such modification per unit of ambient temperature change.

10. In a pressure booster system, an adjustable main reducing valve connected between a supply main and a distributing main and including a pressure responsive element responsive on one side to reduced pressure in the distributing main and on the other side to the pressure in the supply main, a pilot reducing valve between said supply main and said other side of the pressure responsive element of said main reducing valve to normally set the main reducing valve for operation at a predetermined pressure, and means responsive to ambient temperature for modifying the action of said pilot reducing valve in response to ambient temperature changes and thereby changing the value of the pressure from said supply main to effect a corresponding value change in the reduced pressure in said distributing main.

11. In a pressure booster system, an adjustable main reducing valve connected between a supply main and a distributing main, said valve including a pressure responsive element responsive on one side to reduced pressure in the distributing main and on the other side to the pressure in the supply main, a pilot reducing valve between said supply main and said other side of the pressure responsive element of said main reducing valve to normally set the main reducing valve for operation at a predetermined pressure, ambient temperature responsive means modifying the action of said pilot reducing valve upon ambient temperature drop, and a maximum boost limit regulator between said pilot reducing valve and the pressure responsive element of said main reducing valve comprising a third reducing valve set to maintain a predetermined maximum pressure to said pressure responsive element upon the pressure from said pilot reducing valve exceeding such maximum pressure.

12. In a gas pressure booster system, an adjustable main reducing valve including a pressure responsive element responsive on one side to reduced pressure from the main reducing valve and on the other side to the incoming pressure to the main reducing valve, a pilot reducing valve between the incoming pressure line and said other side of said pressure responsive element to normally set the main reducing valve for operation at a predetermined pressure, ambient temperature responsive means modifying the action of said pilot reducing valve and a limit regulator between said pilot reducing valve and said pressure responsive element of said main reducing valve.

13. In a gas pressure booster system, an adjustable main reducing valve connected between a supply main and a distributing main, said valve including a pressure responsive element responsive on one side to reduced pressure in the distributing main and on the other side to the pressure in the supply main, a pilot reducing valve between said supply main and the pressure responsive element of said main reducing valve to normally set the main reducing valve for operation at a predetermined pressure, ambient temperature responsive means modifying the action of said pilot reducing valve upon ambient temperature change, a normally open reducing valve between said pilot reducing valve and said pressure responsive element of said main reducing valve and time controlled means to cause said normally open valve to operate in its reducing capacity during a predetermined portion of a twenty-four hour period.

14. In a gas pressure booster system, an adjustable reducing valve connected between a supply main and a distributing main, ambient temperature responsive means operating in conjunction with the distributing main pressure to control said reducing valve in response to both distributing main pressure and ambient temperature and time controlled means to render such modification ineffective during a predetermined portion of a regularly repeated time.

15. In a pressure booster system, an adjustable main reducing valve connected between a supply main and a distributing main, said valve including a pressure responsive element responsive on one side to reduced pressure in the distributing main and on the other side to the pressure in the supply main, a pilot reducing valve between said supply main and the pressure responsive element of said main reducing valve to normally set the main reducing valve for operation at a predetermined pressure, ambient temperature responsive means modifying the action of said pilot reducing valve upon ambient temperature change, a normally open valve between said pilot reducing valve and said pressure responsive element of said main reducing valve, said normally open valve including a pressure responsive element subject to the pressure of the high side of the pressure responsive element of said main reducing valve, spring means operable on said pressure responsive element of said normally open valve in opposition to the pressure to which the element is responsive and operable to overcome such pressure and thereby move said normally open valve to its reducing position and time controlled means operable to introduce such pressure from the high side of the pressure responsive element of the main reducing valve to the opposite side of the pressure responsive element of the normally open valve during a predetermined portion of a twenty-four hour day to move it from its reducing to its normally open position.

16. In a gas pressure booster system, a main reducing valve connected between a supply main and a distributing main, a pilot reducing valve for effecting a setting of said main reducing valve for operation at a predetermined pressure, temperature responsive means modifying the action of said pilot reducing valve upon ambient temperature changes, a normally open valve between said pilot reducing valve and said main reducing valve, said normally open valve including a pressure responsive element subjected to the pressure of the high side of the pressure responsive element of said main reducing valve to close said normally open valve and time controlled means operable to introduce such pressure from the high side of the pressure responsive element of the main reducing valve to the opposite side of the pressure responsive element of the normally open valve during a predetermined portion of a twenty-four hour day to move it from its closed to its normally open position.

17. In a gas pressure booster system, an adjustable main reducing valve connected between a supply main and a distributing main, said valve including a pressure responsive element responsive on one side to reduced pressure in the distributing main and on the other side to the pressure in the supply main, a pilot reducing valve between said supply main and the pressure responsive element of said main reducing valve to normally set the main reducing valve for operation at a predetermined pressure, ambient temperature responsive means modifying the action of said pilot reducing valve upon ambient temperature falling below a predetermined value, a maximum boost limit regulator between said pilot reducing valve and the pressure responsive element of said main reducing valve comprising a third reducing valve set to maintain a predetermined maximum pressure to said pressure responsive element upon the pressure from said pilot reducing valve exceeding such maximum pressure, a normally open reducing valve between said pilot reducing valve and the pressure responsive element of said main reducing valve and time controlled means to cause said normally open reducing valve to act as a reducing valve during a predetermined portion of a predetermined time period.

KENNETH R. D. WOLFE.